United States Patent
Engström et al.

(10) Patent No.: US 10,992,205 B2
(45) Date of Patent: Apr. 27, 2021

(54) ARRANGEMENT FOR COOLING OF AN ELECTRICAL MACHINE

(71) Applicant: Scania CV AB, Södertälje (SE)

(72) Inventors: Jörgen Engström, Grödinge (SE); Stefan Karlsson, Rönninge (SE)

(73) Assignee: Scania CV AB, Södertälje (SE)

( * ) Notice: Subject to any disclaimer, the term of this patent is extended or adjusted under 35 U.S.C. 154(b) by 421 days.

(21) Appl. No.: 16/075,947

(22) PCT Filed: Feb. 7, 2017

(86) PCT No.: PCT/SE2017/050111
§ 371 (c)(1),
(2) Date: Aug. 6, 2018

(87) PCT Pub. No.: WO2017/142457
PCT Pub. Date: Aug. 24, 2017

(65) Prior Publication Data
US 2020/0389072 A1 Dec. 10, 2020

(30) Foreign Application Priority Data
Feb. 19, 2016 (SE) .................................. 1650215-5

(51) Int. Cl.
*H02K 9/00* (2006.01)
*H02K 9/193* (2006.01)
(Continued)

(52) U.S. Cl.
CPC .............. *H02K 9/193* (2013.01); *B60K 11/02* (2013.01); *H02K 5/20* (2013.01); *H02K 11/25* (2016.01); *H02K 2205/09* (2013.01)

(58) Field of Classification Search
CPC ............ H02K 9/19; H02K 9/197; H02K 9/12; H02K 9/04; H02K 11/25; H02K 5/20;
(Continued)

(56) References Cited

U.S. PATENT DOCUMENTS 6,244,034 B1 * 6/2001 Taylor ....................... F02C 6/16
60/776
6,515,384 B1 * 2/2003 Kikuchi ................... H02K 1/20
310/54

(Continued)

FOREIGN PATENT DOCUMENTS

CN    101107767 A    1/2008
CN    103703659 A    4/2014

(Continued)

OTHER PUBLICATIONS

SCANIA CV AB, Korean Application No. 10-2018-7025923, Office Action, dated May 7, 2019.

(Continued)

Primary Examiner — Thanh Lam
(74) Attorney, Agent, or Firm — Moore & Van Allen PLLC; W. Kevin Ransom

(57) ABSTRACT

The present invention relates to an arrangement for cooling of an electrical machine. The electrical machine comprises a rotor rotatably arranged around a rotation axis, a stator including a stator winding arranged radially outside of the rotor, a housing enclosing the rotor and the stator, at least one drain hole configured to drain a cooling fluid from the housing, at least one spraying device configured to spray cooling fluid on the stator winding and a pump configured to pump cooling fluid to the spraying device. The arrangement comprises a control unit, which is configured, when the electrical machine is in operation, to receive information of the temperature in at least one position of the stator winding and to control the pump such that it pumps a flow rate of the cooling fluid to the spraying device, which is related to the estimated temperature of the stator winding.

20 Claims, 2 Drawing Sheets

(51) Int. Cl.
   *H02K 11/25* (2016.01)
   *B60K 11/02* (2006.01)
   *H02K 5/20* (2006.01)

(58) Field of Classification Search
   CPC . H02K 2205/09; H02K 2205/00; B60K 11/02
   USPC .......................................... 310/52–54, 57–59
   See application file for complete search history.

(56) References Cited

U.S. PATENT DOCUMENTS

| | | | |
|---|---|---|---|
| 7,211,913 B2* | 5/2007 | Tsutsui | H02K 11/25 |
| | | | 310/54 |
| 8,247,934 B2* | 8/2012 | Matsui | H02K 3/24 |
| | | | 310/54 |
| 8,432,075 B2* | 4/2013 | Fulton | H02K 9/24 |
| | | | 310/54 |
| 2005/0206248 A1 | 9/2005 | Raszkowski et al. | |
| 2005/0285457 A1 | 12/2005 | Tsutsui et al. | |
| 2007/0278869 A1* | 12/2007 | Taketsuna | H02K 9/19 |
| | | | 310/54 |
| 2009/0184591 A1 | 7/2009 | Hoshino et al. | |
| 2010/0033040 A1* | 2/2010 | Wakita | H02K 11/25 |
| | | | 310/54 |
| 2011/0148229 A1 | 6/2011 | Esse | |
| 2013/0264034 A1 | 10/2013 | Hamer et al. | |
| 2014/0077635 A1 | 3/2014 | Hossain | |
| 2014/0191696 A1 | 7/2014 | Hattori | |
| 2016/0332521 A1 | 11/2016 | Suzuki | |
| 2017/0133972 A1 | 5/2017 | Ito et al. | |

FOREIGN PATENT DOCUMENTS

| | | |
|---|---|---|
| DE | 19824202 C1 | 9/1999 |
| JP | 11318055 A | 11/1999 |
| JP | 2006197772 A | 7/2006 |
| JP | 2013207957 A | 10/2013 |
| JP | 2015142415 A | 8/2015 |
| WO | 2013014523 A2 | 1/2013 |
| WO | 2015199176 A1 | 4/2017 |

OTHER PUBLICATIONS

SCANIA CV AB, International Application No. PCT/SE2017/050111, International Preliminary Report on Patentability, dated Aug. 21, 2018.
SCANIA CV AB, European Application No. 17753572.1, Extended European Search Report, dated Aug. 9, 2019.
SCANIA CV AB, Chinese Application No. 201780011104.4, First Office Action, dated Sep. 3, 2019.
Swedish Office Action for SE Patent Application No. 1650215-5 dated Oct. 7, 2017.
International Search Report for International Patent Applicaiton No. PCT/SE2017/050111 dated Apr. 28, 2017.
Written Opinion of the International Searching Authority for International Patent Application No. PCT/SE2017/050111 dated Apr. 28, 2017.
SCANIA CV AB, Chinese Patent Application No. 201780011104.4, Second Office Action, dated Mar. 3, 2020.
SCANIA CV AB, Chinese Patent Application No. 201780011104.4, Decision of Rejection, dated Aug. 28, 2020.
Scania CV AB, European Application No. 17753572.1, Communication pursuant to Article 94(3) EPC, dated Dec. 7, 2020.

* cited by examiner

ARRANGEMENT FOR COOLING OF AN ELECTRICAL MACHINE

CROSS-REFERENCE TO RELATED APPLICATION(S)

This application is a National Stage Application (filed under 35 § U.S.C. 371) of PCT/SE2017/050111, filed Feb. 7, 2017 of the same title, which, in turn claims priority to Swedish Application No. 1650215-5 filed Feb. 19, 2016 of the same title; the contents of each of which are hereby incorporated by reference.

FIELD OF THE INVENTION

The present invention relates to an arrangement for cooling of an electrical machine.

BACKGROUND TO THE INVENTION

A power train of a hybrid vehicle may be powered by an electrical machine and a combustion engine. The electrical machine works as an engine and provide power during certain operating conditions such as during idling conditions, at low speeds and accelerations of the vehicle. During certain operating conditions, the electrical machine works as a generator where it supplies electrical energy to a battery. The electrical machine is in an operation when it works as an engine or as a generator. The combustion engine may power the vehicle independently during certain operating conditions of the vehicle at the same time as the electrical machine does not work as generator. During such operating conditions, the electrical machine is out of operation. The electrical machine is heated when it is in operation. Conventional cooling of electrical machines in hybrid vehicles may be performed by air or water led past an external surface of a housing enclosing the electrical machine. A more effective cooling method is to spray oil on the stator windings.

US 2011/0148229 shows an electrical machine including a rotor and a stator, which are arranged in a housing. A number of cooling devices generates a coolant spray on the stator during operation of the electrical machine. A sump pan receives the supplied coolant at a bottom portion of the housing. A coolant discharge is mounted at a lowest point of the sump pan. The coolant discharge directs coolant to a coolant reservoir. A coolant pump pumps coolant from the coolant reservoir to the coolant spray device. A coolant overflow defines a highest coolant level in the sump pan. When the electrical machine is not in operation, the pump feeds a coolant flow to the coolant spray device of a small quantity such that no coolant level is created in the housing. When the electrical machine is in operation, the pump feeds a coolant flow of a larger quantity to the coolant spray device such that a coolant level is created in the housing, which wets the rotor. In this case, the rotor distributes the coolant in the housing, which results in an effective cooling of the electrical machine. However, the electrical machine receives relatively large drag losses during operation since the rotor rotates continuously in contact with the coolant in the housing during operation of the electrical machine.

SUMMARY OF THE INVENTION

The object of the invention is to establish an arrangement which provides an effective cooling of an electrical machine in a manner such that unnecessary losses are avoided.

This object is achieved with the arrangement defined for cooling of an electrical machine. The temperature rise in an electrical machine is substantially confined to specific components and especially to the stator winding. Thus, it is effective to cool the electrical machine by injecting a cooling fluid on the stator winding. The cooling fluid may be a suitable oil. The cooling demand of the stator winding varies during different operation conditions. Generally, the cooling demand increases with the temperature of the stator. The cooling of the stator winding depends on the flow rate of cooling fluid to the stator winding. However, it requires more pump energy to supply a larger flow rate to the stator windings than a lower flow rate.

The control unit may have access to stored information about suitable flow rates at different temperatures of the stator winding. The control unit may receive information of the temperature of the stator winding substantially continuously. In case the cooling flow rate to the spraying device differs from a suitable flow rate at a specific temperature of the stator winding, the control unit controls the pump such that the flow rate is adjusts to the desired value. In this case, it is possible to provide an effective cooling of the stator winding when the electrical machine is high loaded and save pump energy when the electrical machine is low loaded.

According to an embodiment of the invention, the pump is configured, when the electrical machine is in operation, to provide a flow rate of the cooling fluid creating a cooling fluid level in the housing related to the temperature of the stator winding. The drainage hole of the housing has a size which determines the flow rate of the coolant fluid out of the housing. Thus, in order to create a cooling fluid level in the housing, it is necessary to supply a larger flow rate to the housing than the flow rate leaving the housing via the drainage hole. The outlet flow rate through the drainage hole increases somewhat with an increasing cooling fluid level in the housing. Due to this fact, it is possible to determine a relationship between flow rate of cooling fluid pumped to the housing and cooling fluid level in the housing.

According to an embodiment of the invention, the pump is configured, at a first temperature of the stator winding, to provide a flow rate creating a cooling fluid level in the housing at which the cooling fluid covers at least a part of a lowest located portion of the stator winding. It is many times difficult to provide an effective cooling of the lowest located portion of the stator winding. In this case, a very effective cooling of the lowest located portion of the stator winding it is obtained since it has a part in constant contact with the cooling fluid. It is possible to vary the size of the part of the stator winding covered by the cooling fluid by adjustment of the cooling fluid level in the housing.

According to an embodiment of the invention, the pump is configured, at a second temperature of the stator winding, to provide a flow rate creating a cooling fluid level in the housing at which the cooling fluid comes in contact with the rotor. In this case, the rotor will splash around the cooling fluid in the housing such that it comes in contact with portions of the stator winding located at a higher level than the cooling fluid level. In this case, substantially all portions of the stator winding receive a very effective cooling by the cooling fluid. When the stator winding has a high temperature, it is suitable to create such a cooling fluid level in the housing in order to increase the cooling of the stator winding. When the temperature of the stator winding has been lowered to a more ordinary temperature, it is many times possible to create a cooling fluid level out of contact with the rotor in order to reduce drag losses of the electrical machine.

According to an embodiment of the invention, the pump is configured, at a third temperature of the stator winding, to provide a flow rate creating substantially no cooling fluid level in the housing. In case the temperature of the stator winding decreases, it is possible to reduce the flow rate pumped to the spraying device. The reduced flow rate results in a lowered cooling fluid level in the housing. In case the flow rate to the housing decreases to a level below the flow rate leaving the housing via the drainage hole there will be no cooling fluid level in the housing. With such a low flow rate to the housing, pump energy is saved.

According to an embodiment of the invention, said pump is able to adjust the cooling fluid flow to the spraying device in a substantially stepless manner. In this case, it is possible to adjust the cooling fluid level in the housing with a high accuracy. Alternatively, the control unit may control the pump such that it is restricted to provide a number of flow rates of predetermined values.

According to an embodiment of the invention, the control unit is configured to control the pump such that it pumps a flow rate to the housing in order to maintain a temperature of the stator windings within a predetermined temperature range. In case the temperature of the stator winding is higher than the highest temperature of the temperature range, the pump may provide a high flow rate to the housing creating a cooling fluid level in contact with the rotor. In case the temperature of the stator winding is lower than a lowest temperature of the temperature range, the pump may provide a low flow rate creating substantially no cooling fluid level in the housing.

According to an embodiment of the invention, it comprises a temperature sensor configured to sense the temperature of stator winding in at least one position. In this case, the control unit receives a reliable information about the temperature in at least one portion the stator winding. Alternatively, the control unit is configured to receive information about at least one operating parameter of the electrical machine and to determine the temperature of the stator windings by means of this operating parameter. The control unit may receive information about operating parameters of the electrical machine such as torque and speed. By means of this information it is possible to determine the temperature of the stator winding and the cooling demand of the stator winding.

According to an embodiment of the invention, the spraying device is configured to spray cooling fluid on a portion of the stator winding arranged at an upper half of the stator. It is many times sufficient to spray cooling fluid on some upper portions of the stator winding. The injected cooling fluid cools the upper portions whereupon the cooling fluid flows downwardly along the lower located portions of the stator winding. In practice, a part of the cooling fluid, which hits the upper portions of the stator winding, bounces away from the stator winding. This cooling fluid may hit a wall of the housing where it flows downwardly without taking up any heat from lower located portions of the stator winding. In this case, there is a risk that the lowest located portion of the stator winding receives an insufficient cooling. In such a case, it is especially important to create a cooling fluid level in the housing in contact with at least a part of the lower portions of the start winding.

According to an embodiment of the invention, the housing comprises at least one further drainage hole configured to define a maximum cooling fluid level in the housing. Such at least one further drainage is arranged at a specific level in the housing. A surplus of cooling fluid above said level is drained out from the housing via said at least one drainage hole. Thus, such a drainage hole defines a maximum cooling fluid level in the housing in a simple and reliable manner. It is possible to arrange drainage holes at different high levels in the housing in order to accomplish further cooling fluid levels in the housing. It is possible to arrange drainage holes at an appropriate level for preventing the pump to run dry.

According to an embodiment of the invention, the control unit may be configured to control the pump, when the electrical machine is not in operation, such that is pumps a flow rate creating substantially no cooling fluid level in the housing. During times when the electrical machine does not provide any torque, it is out of operation. During such times, there is no cooling demand of the stator winding and is possible to pump a minimum flow rate to the housing creating substantially no cooling fluid level in the housing.

According to an embodiment of the present invention, the arrangement may be comprised in an electrical machine in a power train of a vehicle. In this case, the electrical machine may work as a motor as well as a generator. The electrical machine is in operation when it provides a torque. The vehicle may be a hybrid vehicle powered by the electrical machine and a combustion engine.

BRIEF DESCRIPTION OF THE DRAWINGS

A preferred embodiment of the invention is described below by way of an example with reference to the attached drawings, on which.

DETAILED DESCRIPTION OF THE INVENTION

Figure 1:
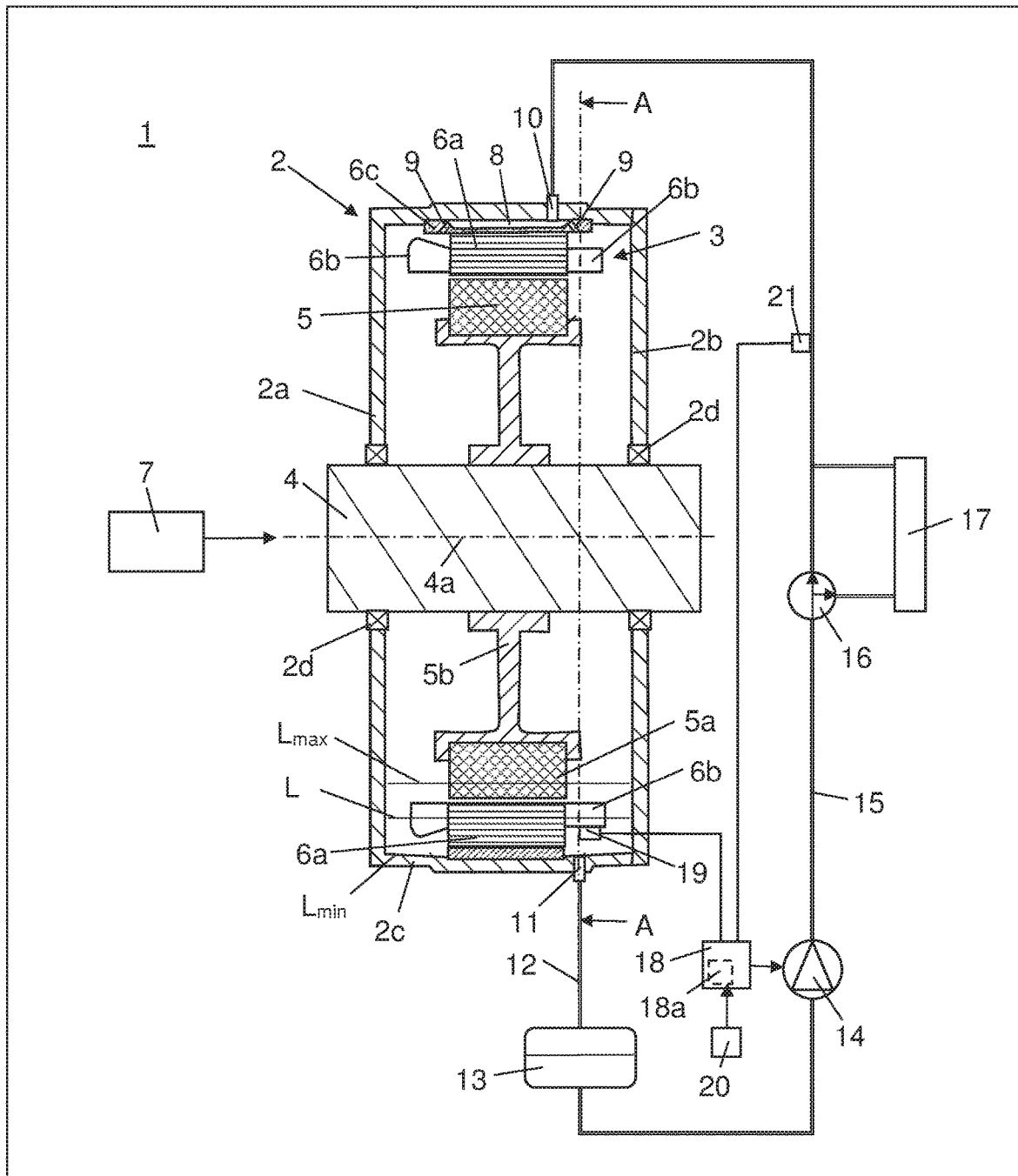
FIG. 1 shows an arrangement for cooling of an electrical machine.

FIG. 1 shows a schematically indicated hybrid vehicle 1 and a housing 2 enclosing an electrical machine 3. A rotatable shaft 4 extends through a first sidewall 2a of the housing 2 and a second sidewall 2b of the housing 2. A periphery wall 2c connects the sidewalls 2a, 2b of the housing 2. The shaft 4 is rotatably arranged in relation to the side 2a, 2b by means of bearings 2d. The electrical machine 3 comprises in a conventional way a rotor 5 and a stator 6. The rotor 5 comprises a rotor core 5a supported by a rotor hub 5b.

The rotor hub 5b is fastened on the rotatable shaft 4 by means of a splined connection. Alternatively, it may be arranged on a ring wheel of a planetary gear. The rotor 5 and the shaft 4 rotates around a common rotation axis 4a. The stator 6 comprises a stator core 6a, a stator winding 6b which is arranged on an inside of the periphery wall 2c of the housing 2 and a mantle 6c. A schematically indicated combustion engine 7 is also connected to the shaft 4. A cooling fluid, which is exemplified as a suitable oil, is supplied to the housing 2. The oil cools and lubricates the components in the housing 1. An oil channel 8 is arranged in a radial space between the periphery wall 2c and a mantle 6c in the housing 2. Oil is supplied with a positive pressure, via an inlet hole 10 in the housing 2, to the oil channel 8. The oil channel 8 comprises a number of outlet ducts 9 in the mantle 6c. Oil is sprayed, via the outlet ducts 9, towards a number of portions of the stator winding 6b located at an upper half of the stator 6.

The housing 2 comprises a drainage hole 11 located at a lowermost position of the housing 2. The drainage hole 11 is, via a drain line 12, connected to an oil receiver 13. A pump 14 pumps oil from the oil receiver 13, via an oil line 15, to the oil channel 8 in the housing 2. The oil line 15 comprises a thermostat 16. In case the oil has a lower temperature than a regulating temperature of the thermostat 16, the thermostat 16 directs the oil to the housing 2 without cooling. In case the oil has a higher temperature than the regulating temperature of the thermostat 16, the thermostat 16 directs the oil to a cooler 17 before it is directed to the housing 2. A control unit 18 is configured to control the speed of the pump 14 and the flow rate of the oil pumped to the housing 2. A temperature sensor 19 is configured to sense the temperature in at least one portion of the stator winding 6b. The control unit 18 receives information from the temperature sensor 19 about the temperature of the stator winding 6b. Furthermore, the control unit 18 receives information 20 about the torque. The information 20 may also include other operating parameters such as the speed of the electrical machine 3. The control unit 18 is able to determine the temperature of the stator winding 6b by means of such operating parameters. The control unit may also receive information from a second temperature sensor 21 about the temperature of the oil pumped to the housing 2.

Figure 2:
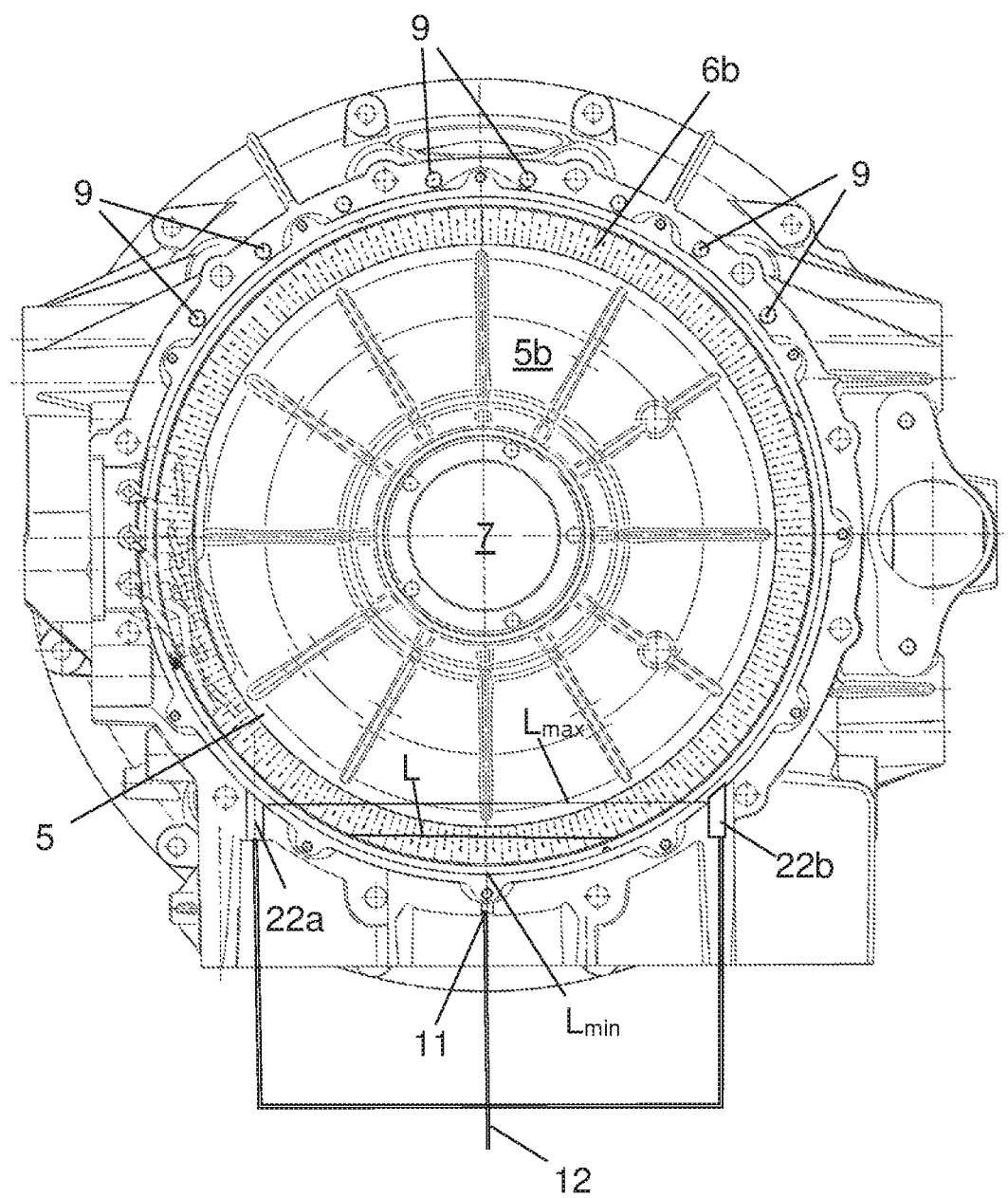
FIG. 2 shows a cross sectional view in the plane A-A in FIG. 1.

FIG. 2 shows a cross sectional view in a plane A-A in FIG. 1. It is here visible that the housing 2 comprises a number of outlet ducts 9 arranged in different positions in an upper part of the housing 2. Two further drainage holes 22a, 22b defines a maximum oil level $L_{max}$ in the housing 2. The maximum oil level $L_{max}$ is located at a higher level than a lowest position of the rotor 5. Thus, the rotor 5 comes in contact with the oil when there is a maximum oil level $L_{max}$ in the housing 2. The oil level L in the housing can be adjusted between a minimum oil level $L_{min}$ when there is substantially no oil level in the housing 2 and up to the maximum oil level $L_{max}$. A further oil level L is indicated in the figures in which the oil is in contact with a lower portion of the stator winding 6b but out of contact with the rotor 5.

The electrical machine 3 is in operation when it works as a motor and powers the hybrid vehicle 1. The electrical machine 3 is also in an operation when it works as a generator and charges a battery in the hybrid vehicle 1. The electrical machine 3 is heated when it is in operation and needs to be cooled. During conditions when the hybrid vehicle 1 is running and the electrical machine 3 does not work as motor or as generator, it is out of operation. In this case, the cooling demand of the electrical machine is substantially negligible. In a hybrid vehicle 1, an electrical machine may be out of operation relatively frequently during conditions when the combustion engine 7 powers the hybrid vehicle 1 independently at the same time as the battery is not charged.

During operation of the hybrid vehicle 1, the control unit 18 may receive information from the temperature sensor 19 about the temperature of the stator winding 6b. The control unit 18 has access to stored information 18a which defines a predetermined oil flow to the housing 2 as a function of the temperature of the stator winding 6b. The temperature of the stator winding 6b is strongly related to the cooling demand of the stator winding 6b. A suitable temperature of the stator winding 6b is within a specific temperature range which, for example, may be 90°-110°. The control unit 18 is configured to substantially continuously receive information 20 about the torque of the electrical machine 3. The information 20 may also include other operating parameters such as the speed of the electrical machine 3. The control unit 18 may also determine the temperature of the stator winding 6b by means of the information 20 about said operating parameters. The control unit 18 may also receive substantially continuously information from the second temperature sensor 21 about the temperature of the oil directed to the housing 2. The cooling capacity of the electrical machine 2 is also related to the temperature of the oil. The control unit 18 receives substantially continuously information 20 about the torque of the electrical machine 3. In case the torque of the electrical machine 3 differs from zero, the control unit 18 notes that the electrical machine 3 is in operation. In case the electric machine 3 is zero the control unit 18 notes that the electrical machine is out of operation.

In case the electrical machine 3 is in operation and the temperature of the stator winding 6b is lower than the lowest temperature in the above exemplified temperature range, there is a low cooling demand of the electrical machine 3. The control unit 18 controls the pump 14 such that it provides a relatively low flow rate of oil, via the oil line 15, to the housing 2. The low flow rate of oil enters, via the inlet hole 10, the oil channel 8. The oil is sprayed, by the outlet duct 9, on a number of portions of the stator winding 6b located at an upper half of the stator 6. The oil hits and cools said upper portions of the stator winding 6b. Preferably, a relatively large part of the oil will be remain on the stator winding 6b. This part of the oil flows downwardly along the stator winding 6b and cools lower portions of the stator winding 6b. The oil is collected on a bottom portion of the housing 2. The oil leaves the housing via the drainage hole 11. In this case, the flow rate of oil to the housing 2 is lower than the flow rate capacity of the drainage hole 11. Consequently, there will be substantially no oil level $L_{min}$ in the housing 2. The oil flows from the housing 2, via the drain line 12, to the oil receiver 13. Since the cooling demand is low, it is possible to direct a low flow rate of oil to the housing 2 and save pump energy.

In case the electrical machine 3 is in operation and that the temperature of the stator winding 6b is within the above mentioned specific temperature range, there is a medium cooling demand of the electrical machine 3. The control unit 18 controls the pump 14 such that it pumps a medium flow rate of oil, via the oil line 15, to the housing 2. In this case, a higher cooling of the stator winding 6b is received due to the higher flow rate of oil sprayed on the stator winding 6b. Also within this temperature range, the cooling demand and the flow rate to the housing may vary with the temperature of the stator winding 6b. Under all circumstances, the medium flow rate of oil to the housing 2 is to be somewhat higher than the flow rate of oil through the drainage hole 11. However, the outlet flow rate of oil through the drainage hole 11 increases somewhat with the oil level L in the housing 2. Due to this fact, it is possible to determine a relationship between flow rate of oil to the housing 2 and the oil level L in the housing 2. In this case, a medium oil level L is supplied to the housing 2 which creates an oil level L at which the oil covers at least a part of a lowest located portion of the stator winding 6b. When oil is sprayed on portions of the stator winding 6b located at an upper half of the stator 6, there is a risk that portions of the stator winding 6b located at a lower half of the stator winding and especially the lowest located portion of the stator winding 6b receives a poor cooling. In this case, the cooling of the lowest located portion of the stator winding 6b will be considerably increased since it is more or less covered by oil. It is possible to adjust the flow rate of the oil and the oil level L in the housing 2 substantially continuously in order to provide a desired cooling of the stator winding 6b with a high accuracy.

In case the electrical machine 3 is in operation and the temperature of the stator winding 6b is higher than the highest temperature in the above exemplified temperature range, there is a high cooling demand of the electrical machine 3. The control unit 18 controls the pump 14 such that it pumps a high flow rate of oil, via the oil line 15, to the housing 2. The high flow rate of oil provides an effective cooling of stator winding 6b. The high flow rate of oil to the housing 2 is considerably higher than the oil flow rate through the drainage hole 11. Consequently, a maximum oil level $L_{max}$ is created in the housing 2. The maximum oil level $L_{max}$ is defined by two further drainages holes 22a, 22b. The total flow rate capacity of the further drainage holes 22a, 22b and the ordinary drainage hole 11 is larger the high flow rate pumped to the housing 2. Consequently, the oil level in the hosing 2 will not be higher than the maximum oil level $L_{max}$. The maximum oil level $L_{max}$ is located at a higher level than the lowest portion of the rotor 5. Thus, the rotor 5 splashes the oil around in the housing thus further increasing the cooling of the stator winding 6b.

The above mentioned cooling arrangement results in a more uniform temperature in the stator winding 6b over time and driving modes that allow to better optimize the electrical machine 3 and give better vehicles characteristics. Improved cooling performance at high cooling demand. Since the control unit 18 controls the speed of the pump 14, the cooling performance is not affected by the speed of the vehicle 1. A very effective cooling of the lowest located portion of the stator winding 6b is obtained. No drag losses in the oil when there is a low or medium cooling demand.

The invention is in no way limited to the embodiment to which the drawing refers but may be varied freely within the scopes of the claims. It is possible to vary the flow rate of oil to the housing in substantially arbitrary manner in relation to the temperature of the stator winding for accomplish an effective cooling of the stator winding 6b. The electric machine may be connected to an electric powertrain in a purely electrically powered vehicle.

The invention claimed is:

1. An arrangement for cooling of an electrical machine, wherein the electrical machine comprises a rotor rotatably arranged around a rotation axis, a stator including a stator winding arranged radially outside of the rotor, a housing enclosing the rotor and the stator, at least one drain hole configured to drain a cooling fluid from the housing, said arrangement comprising:
   at least one spraying device configured to spray cooling fluid on the stator winding;
   a pump configured to pump cooling fluid to the housing; and
   a control unit which is configured, when the electrical machine is in operation, to receive information of a temperature in at least one position of the stator winding and to control the pump such that it provides a flow rate of the cooling fluid to the housing as a function of the temperature of the stator winding and a flow rate creating a cooling fluid level in the housing related to the temperature of the stator winding.

2. An arrangement according to claim 1, wherein the pump is configured, at a first temperature of the stator winding, to provide a flow rate creating a cooling fluid level in the housing at which the cooling fluid covers at least a part of a lowest located portion of the stator winding.

3. An arrangement according to claim 1, wherein the pump is configured, at a second temperature of the stator winding which is higher than a first temperature of the stator winding, to provide a flow rate creating a cooling fluid level in the housing at which the cooling fluid comes in contact with the rotor.

4. An arrangement according to claim 1, wherein the pump is configured, at a third temperature of the stator winding which is lower than a first temperature of the stator winding, to provide a flow rate creating substantially no cooling fluid level in the housing.

5. An arrangement according to claim 1, wherein said pump is able to adjust the flow rate in a substantially stepless manner.

6. An arrangement according to claim 1, wherein the control unit is configured to control the pump such that it pumps a flow rate to the housing in order to maintain a temperature of the stator winding within a predetermined temperature range.

7. An arrangement according to claim 1, further comprising a temperature sensor configured to sense a temperature of the stator windings.

8. An arrangement according to claim 1, wherein the control unit is configured to receive information about at least one operating parameter of the electrical machine and to determine a temperature of the stator winding by means of this operating parameter.

9. An arrangement according to claim 1, wherein the spraying device is configured to spray cooling fluid on a portion of the stator winding arranged at an upper half of the stator.

10. An arrangement according to claim 1, wherein the housing comprises at least one further drainage hole configured to define a maximum cooling fluid level in the housing.

11. An arrangement according to claim 1, wherein the control unit is configured to control the pump, when the electrical machine is out of operation, such that the pump pumps a flow rate to the housing at which substantially no cooling fluid level is created in the housing.

12. A vehicle comprising an arrangement for cooling of an electrical machine, wherein the electrical machine comprises a rotor rotatably arranged around a rotation axis, a stator including a stator winding arranged radially outside of the rotor, a housing enclosing the rotor and the stator, at least one drain hole configured to drain a cooling fluid from the housing, said arrangement comprising:
   at least one spraying device configured to spray cooling fluid on the stator winding;
   a pump configured to pump cooling fluid to the housing; and
   a control unit which is configured, when the electrical machine is in operation, to receive information of a temperature in at least one position of the stator winding and to control the pump such that it provides a flow rate of the cooling fluid to the housing as a function of the temperature of the stator winding and a flow rate creating a cooling fluid level in the housing related to the temperature of the stator winding.

13. A vehicle according to claim 12, wherein the pump is configured, at a first temperature of the stator winding, to provide a flow rate creating a cooling fluid level in the housing at which the cooling fluid covers at least a part of a lowest located portion of the stator winding.

14. A vehicle according to claim 12, wherein the pump is configured, at a second temperature of the stator winding which is higher than a first temperature of the stator winding, to provide a flow rate creating a cooling fluid level in the housing at which the cooling fluid comes in contact with the rotor.

15. A vehicle according to claim 12, wherein the pump is configured, at a third temperature of the stator winding which is lower than a first temperature of the stator winding, to provide a flow rate creating substantially no cooling fluid level in the housing.

16. A vehicle according to claim 12, wherein said pump is able to adjust the flow rate in a substantially stepless manner.

17. A vehicle according to claim 12, wherein the control unit is configured to control the pump such that it pumps a flow rate to the housing in order to maintain a temperature of the stator winding within a predetermined temperature range.

18. A vehicle according to claim 12, further comprising a temperature sensor configured to sense a temperature of the stator windings.

19. A vehicle according to claim 12, wherein the control unit is configured to receive information about at least one operating parameter of the electrical machine and to determine a temperature of the stator winding by means of this operating parameter.

20. A vehicle according to claim 12, wherein the spraying device is configured to spray cooling fluid on a portion of the stator winding arranged at an upper half of the stator.

* * * * *